United States Patent
Burns (10) Patent No.: US 7,225,320 B2
(45) Date of Patent: May 29, 2007

(54) CONTROL ARCHITECTURE FOR A HIGH-THROUGHPUT MULTI-PROCESSOR CHANNEL DECODING SYSTEM

(75) Inventor: Geoffrey Francis Burns, Ridgefield, CT (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 1128 days.

(21) Appl. No.: 09/752,944

(22) Filed: Dec. 28, 2000

(65) Prior Publication Data

US 2002/0087998 A1    Jul. 4, 2002

(51) Int. Cl.
G06F 15/00 (2006.01)
G06F 15/173 (2006.01)
G06F 15/16 (2006.01)

(52) U.S. Cl. ............... 712/15; 712/23; 712/28; 707/8; 707/10; 707/201; 709/226; 709/245

(58) Field of Classification Search ............ 725/85, 725/131–134, 139–140, 151–152; 348/553–555, 348/725–728, 731, 388.1, 719, 721; 707/8, 707/10, 200, 207; 709/209, 226, 245; 712/15, 712/23, 28
See application file for complete search history.

(56) References Cited

U.S. PATENT DOCUMENTS

| 5,471,592 | A | * | 11/1995 | Gove et al. ............... 709/213 |
| 5,502,512 | A | * | 3/1996 | Toyoda et al. ............ 348/706 |
| 5,583,500 | A | * | 12/1996 | Allen et al. ............... 341/107 |
| 5,600,844 | A | | 2/1997 | Shaw et al. ............... 395/800 |
| 5,646,687 | A | * | 7/1997 | Botsford et al. ........ 375/240.12 |
| 5,666,169 | A | * | 9/1997 | Ohki et al. ............... 348/721 |
| 5,675,387 | A | * | 10/1997 | Hoogenboom et al. 375/240.15 |
| 5,685,005 | A | * | 11/1997 | Garde et al. ............... 712/36 |
| 5,706,290 | A | | 1/1998 | Shaw et al. ............... 370/465 |
| 5,844,941 | A | * | 12/1998 | Mack et al. ............... 375/232 |
| 5,923,892 | A | * | 7/1999 | Levy ....................... 712/31 |
| 5,931,938 | A | * | 8/1999 | Drogichen et al. ........ 712/15 |
| 5,968,167 | A | | 10/1999 | Whittaker et al. ......... 712/225 |
| 6,081,783 | A | * | 6/2000 | Divine et al. ............. 704/500 |

(Continued)

OTHER PUBLICATIONS

R.C. Holland, Integrated Circuits and Microprocessors, 1986, Pergamon Books, Ltd., First edition, pp. 1-6.*

(Continued)

Primary Examiner—Kieu-Oanh Bui
(74) Attorney, Agent, or Firm—Paul Im (57) ABSTRACT

A multi-processor unit includes a first domain for processing data according to first configuration information and having multiple first domain processors each connected to communication apparatus and each performing a different function of the first processing. The first domain processors include a first domain control processor for controlling the first processing of the first domain. The multi-processor unit also includes a second domain for second processing of the first processed data depending on a second domain configuration and having multiple second domain processors each connected to the communication apparatus and each performing a different function of the second processing. The second domain processors include a second domain control processor for controlling the second processing of the second domain. The multi-processor unit also including a global control processor connected to the communication means for providing the first domain configuration information and the second domain configuration information through the communication means for configuring the first and second domains.

20 Claims, 3 Drawing Sheets

U.S. PATENT DOCUMENTS

| | | | |
|---|---|---|---|
| 6,360,220 B1 * | 3/2002 | Forin | 707/8 |
| 6,457,053 B1 * | 9/2002 | Satagopan et al. | 709/226 |
| 6,484,220 B1 * | 11/2002 | Alvarez et al. | 710/46 |
| 6,542,203 B1 * | 4/2003 | Shadwell et al. | 348/726 |
| 6,601,173 B1 * | 7/2003 | Mohler | 726/7 |
| 6,630,964 B2 * | 10/2003 | Burns et al. | 348/554 |
| 2003/0032390 A1 * | 2/2003 | Geile et al. | 455/3.05 |
| 2003/0072370 A1 * | 4/2003 | Girod et al. | 375/240.13 |

OTHER PUBLICATIONS

K. Olukotun et al., The Case for a Single-Chip Multiprocessor, Oct. 1996.*

* cited by examiner

CONTROL ARCHITECTURE FOR A HIGH-THROUGHPUT MULTI-PROCESSOR CHANNEL DECODING SYSTEM

FIELD OF THE INVENTION

The invention is related to the field of control of multi-processor systems and more specifically to multi-processor systems for channel decoding transmissions based on multiple different standards.

BACKGROUND OF THE INVENTION

A program control mechanism is required in any multi-processor system. Multi-processor signal processing systems that process signals on a sample-by-sample basis often use a data flow driven process control. In data flow driven control the operation of individual processors is triggered by the arrival of data samples from an upstream processor. If multiple samples are required for processing in data flow driven control a mechanism such as a scoreboard is used to determine when all the required data has arrived.

Multi-processor systems where the processors access shared memory blocks are usually controlled by a central controller that implements a complex arbitration scheme. The central controller determines which processors can access a particular memory block depending on priorities and in order to avoid memory conflicts. A processor requests access to required memory blocks and access is granted depending on what other blocks the process has requested access to as well as the memory blocks that other processors have requested access to.

In digital television broadcasting channel decoders for some transmission standards may be implemented using simple data flow control. In the U.S., the standard for terrestrial transmission is trellis coded 8-level Vestigial Side-band (8-VSB) modulation prescribed by the Advanced Television Systems Committee (ATSC) and cable transmission will probably use the same standard. Using this standard, a multi-processing channel decoders can be provided in which only a few samples are required for processing in any processor and control can be data driven. TDA8961 from Philips Semiconductors, MCT 2100 from Motorola, NXT2000 from NXTWave Communications are examples of 8-VSB channel decoders.

There are other digital television broadcasting standards where channel decoding algorithms are organized as a cascade of repetitive arithmetic operations on data in large memory blocks. In Europe, the Digital Video Broadcasting (DVB) group prescribes three different standards DVB-S, DVB-C and DVB-T for satellite, cable and terrestrial broadcasting respectively. The modulation scheme used in Europe for these DVB standards is Coded Orthogonal Frequency Division Multiplexing (OFDM). For terrestrial broadcasting, Japan has adapted Bandwidth Segmented Transmission (BST) Orthogonal Frequency Division Multiplexing (OFDM) which is similar to COFDM. OFDM requires block based processing in channel decoding, in which processors share access to the same memory blocks, so that, arbitration of memory access is required. VLSI's VES9600 and LSI Logic's L64780 are examples of DVB-T channel decoders.

Those skilled in the art are directed to U.S. Pat. No. 5,685,005 to Garde which discloses a multi-processor system with arbitration control of shared memory access.

The above citations are hereby incorporated herein in whole by reference.

SUMMARY OF THE INVENTION

In the invention herein, a multi-processor unit has a multitude of processors connected to communication apparatus for receiving data into the unit, transmitting data from the unit, and transmitting information between processors connected to the communication apparatus. The multitude of processors are organized into a plurality of domains. Herein a domain is one or more processors that are controlled by one of the processors of the domain called a domain control processor. The processors of a domain perform related processing on the same data, but each processor of the domain performs different processing on the data, and each domain performs different processing on the data than the other domains. Also, each domain stores configuration information to allow the domain to process different types of transmitted data.

The first domain performs a first processing of the data depending on first domain configuration information. The first domain includes multiple first domain processors each connected to the communication means and each differently sub-processing the data in order to first process the data. The first domain processors include a first domain control processor for controlling the first processing of the first domain.

The second domain performs a second processing on the first processed data depending on second domain configuration information. The second processing being different than the first processing of the data. The second domain includes multiple second domain processors each connected to the communication apparatus and each differently sub-processing the data in order to second process the data. The second domain processors include a second domain control processor for controlling the second processing of the second domain.

The multi-processor unit also includes a global control processor connected to the communication apparatus for providing the first domain configuration information and the second domain configuration information through the communication apparatus to the first and second domain respectively for configuring the first and second domains.

Preferably, the communication apparatus includes a stream-based communication apparatus connected to the global control processor and connected to a plurality of the processors of each of the first and second domains including the first and second domain control processors for transmitting information streams between the connected processors. The stream-based communications means are connected to an input/output bus to at times receive a stream of data into the multi-processor unit through the stream-based communications means into one of the connected processors and to at other times transmit a stream of data from one of the connected processors through the stream-based communications means onto the input/output bus.

Preferably, the multi-processor unit includes blocks of electronic memory and the communication means includes block-based communication means connected to the memory blocks and connected to one or more of the first domain processors and one or more of the second domain processors for selectively interconnecting the connected processors to the memory blocks. Only one processor at a time is interconnected to one of the memory blocks, and processors of different domains are interconnected at different times to the same memory block.

The control of the domain control processors may be data flow driven so that receiving a data object through the stream-based communication means triggers processing by the domain. The data objects include data and indicators of memory blocks. When a domain receives an indicator of a memory block it has exclusive access to the memory block and when the domain passes the indicator of the memory block it yields all access to the memory block. Thus, no arbitration of memory block access by different domains is required. The indicators of memory blocks may be, for example, addresses of the memory blocks.

Preferably, each domain control processor, controls access between the memory blocks that the domain has exclusive access to and the processors of the domain. For example, each processor that is connected to the block-based communication apparatus receives data from the memory blocks and stores data in the memory blocks through address and data registers of the processor and control signals from the domain control processor control operations of the registers of the processors of the domain that load and store information to the memory blocks exclusively accessed by the domain.

Control within the domains may be at least partially, data flow driven depending on data received by the processor from the stream-based communication means and from the memory blocks through the registers controlled by the domain control processor. Also, control within the domains may be at least partially directly controlled by the domain control processor using control signals provided directly from the domain control processor through control lines to the other processors from the domain. For example, the domain control processor of at least one of the domains may include a periodic sequencer that initiates control signals to other processors to initiate subroutines in those processors depending on an index counter.

Preferably, the processing of the first domain includes FFT and IFFT processing of blocks of data in the memory blocks, and the processing of the second domain includes equalization of blocks of data in the memory blocks. Also, the multi-processor unit further comprises a third domain processing means including at least one processor connected to the stream-based communication means for forward error correction of a stream of data.

Each processor may be structurally different from the other processors of the multi-processor unit for performing a different portion of channel decoding of transmission signals. The processors may include digital signal processors which are different due to different writable programming or read only programming or the processors may have fixed differences in their silicon doping and wiring layers.

Preferably, the first and second domain configuration information configures the domains for channel decoding transmissions based on different modulation standards. The configuration information provided by the global control processor may at times configure the first domain processing means and the second domain processing means for channel decoding 8-VSB transmissions based on the ATSC standard. The configuration information provided by the global control processor may at other times configure the first domain processing means and the second domain processing means for channel decoding COFDM transmissions based on the DVB-T standard.

In another aspect of the invention a multi-processor integrated circuit chip may contain the multi-processor unit described above. The chip includes a substrate of semiconductor material having different levels of P and N doping in different portions of the substrate, the substrate being covered with layers containing insulating material and conductors and including connection pads for flip-chip or wire-bond connection to a circuit board. The pads provide connections for ground, supply voltage and the input/output bus.

In another aspect of the invention, a multi-processor circuit board assembly may include the multi-processor circuit chip described above. A plurality of integrated circuit chips including the multi-processor integrated circuit chip are mounted on a circuit board substrate. The circuit board substrate has wire-bond pads and/or flip chip connection pads on its surface and the pads are interconnected by wiring of the circuit board substrate. Bond wires extend between the wire bond pads on the multi-processor integrated circuit chip and wire bond pads on the surface of the circuit board substrate or flip-chip connections extend between flip-chip pads on the multi-processor integrated circuit chip and flip chip pads on the surface of the circuit board substrate.

In another aspect of the invention, a multi-processor set-top-box may contain the multi-processor circuit board assembly described above. The set-top-box includes a connection for receiving a channel encoded multimedia signal from a medium and a connection for transmitting a channel decoded multimedia signal to a multimedia display device. The set top box also contains power supply apparatus connected to the multi-processor circuit board assembly for providing power thereto. The circuit board assembly and the power supply apparatus being contained in an enclosure for protection thereof.

In still another aspect of the invention, a multi-processor television set may contain the multi-processor circuit board assembly described above. The television set includes a source for providing a channel encoded multimedia signal from a transmission media. The television set also includes power supply apparatus connected to the circuit board assembly to provide power to the circuit board assembly. The television also has a display connected to the circuit board assembly for presenting the video signals of the decoded multimedia signal, and a connection for a load speaker connected to the circuit board assembly for presenting audio signals of the decoded multimedia signal. The circuit board assembly and the power supply apparatus being contained in an enclosure for protection thereof.

DETAILED DESCRIPTION OF THE PREFERRED EMBODIMENTS AND BEST MODE

Figure 1:
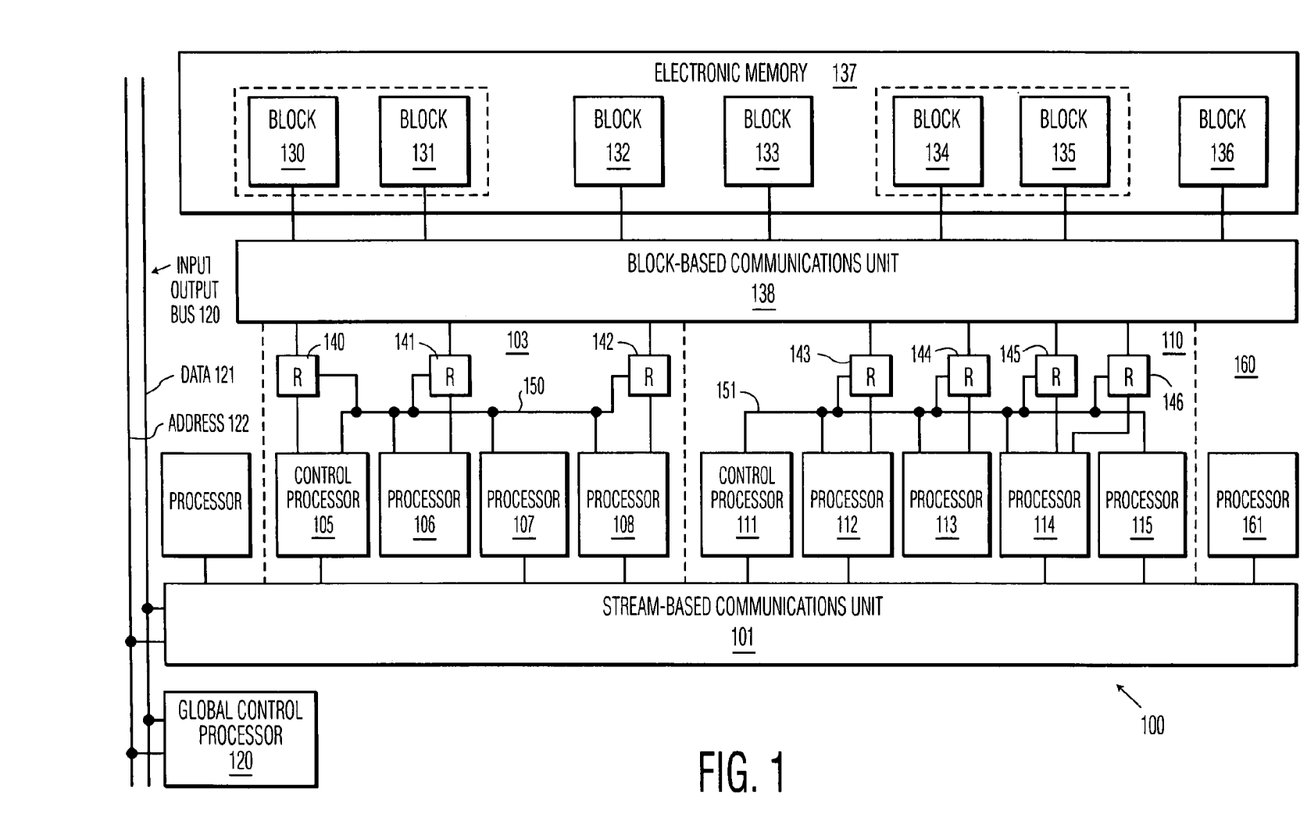
FIG. 1 illustrates a multi-processor unit of the invention with a domain controller for each domain.

FIG. 1 illustrates the multi-processor unit (100) of the invention. The multi-processing unit includes communication apparatus (101, 102) for receiving data into the unit and transmitting data from the unit. The unit also has first domain processing apparatus (103) for first processing the data depending on first domain configuration information.

The first domain processing apparatus includes multiple first domain processors (105-108) each connected to the communication apparatus for receiving information from the communication apparatus and providing information to the communication apparatus including information transmitted between processors. Each first processor sub-processes the data differently than the other first processors in order to first process the data. The first domain processors include a first domain control processor (105) for controlling the first processing of the first domain.

The multi-processing unit also includes second domain processing apparatus (110) for second processing the first processed data depending on second domain configuration information. The second processing is different than the first processing. For example, the first processing may be FFT and IFFT processing of the signal and the second processing may be equalization of the signal. The second domain processing apparatus includes multiple second domain processors (111-115) each connected to the communication apparatus for receiving information from the communication apparatus and providing information to the communication apparatus including information transmitted between processors. Each second processor sub-processes the data differently than the other second processors in order to second process the data. The second domain processors include a second domain control processor (111) for controlling the second processing of the second domain.

The multi-processing unit also includes a global control processor (120) connected to the communication apparatus for providing the first domain configuration information and the second domain configuration information through the communication apparatus for configuring the first and second domains.

The communication apparatus includes a stream-based communication apparatus (101) connected to the global control processor and connected to a plurality of the first processors and a plurality of the second processors for transmitting information streams between the connected processors. The processors connected to the stream-based communication apparatus include the first and second domain control processors. The stream-based communications apparatus are connected to an input/output bus (120) to at times receive a stream of data into the multi-processor unit through the stream-based communications apparatus into one of the connected processors and to at other times transmit a stream of data from one of the connected processors through the stream-based communications apparatus onto the input/output bus.

The multi-processor unit includes memory blocks (130-136) of electronic memory (137) and the communication apparatus includes block-based communication apparatus (138) connected to the memory blocks and connected to one or more of the first domain processors and one or more of the second domain processors for selectively interconnecting the connected processors to the memory blocks. Only one processor at a time is interconnected to one of the memory blocks through the block-based communication apparatus, but processors of different domains are interconnected at different times to the same memory block.

The control of the domain control processors during operation includes data flow driven control so that receiving a data object through the stream-based communication apparatus triggers processing by the domain control processors. The data objects include data and indicators of memory blocks, when a domain receives an indicator of a memory block it has exclusive access to the memory block and when the domain passes the indicator of the memory block it yields all access to the memory block. The indicators of memory blocks include addresses of the memory blocks and an index into the memory block. Each domain control processor, controls access between the memory blocks that the domain has exclusive access to and the processors of the domain;

Each processor that is connected to the block-based communication apparatus receives data from the memory blocks and stores data in the memory blocks through address and data registers (140-145) of the processor. Control signals from the domain control processor control operations of the registers of the processors of the domain that load and store information to the memory blocks exclusively accessed by the domain.

Within the domains, control of the processors includes data flow driven control depending on data received by the processor from the stream-based communication apparatus and from the memory blocks through the registers controlled by the domain control processor. Also within the domains, control of the processors includes direct control by the domain control processor by control signals provided directly through control lines (150, 151) to the other domain processors from the domain control processor. Alternately one or the other of these data flow driven or direct co-processor control methods may be provided.

In the direct processor control, the domain control processors includes a periodic sequencer that initiates control commands transmitted to other processors to initiate subroutines in those processors depending on an index counter.

The processing of the first domain includes FFT and IFFT processing of blocks of data in the memory blocks, and the processing of the second domain including equalization of blocks of data in the memory blocks.

The multi-processor unit further includes a third domain processing apparatus (160) including at least one processor (161) connected to the stream-based communication apparatus for forward error correction of a stream of data. Also, a fourth domain apparatus (162) includes a processor (163) for performing some initial front-end processing.

Each processor is structurally different from the other processors of the multi-processor unit for performing a different portion of channel decoding of transmission signals.

The first and second domain configuration information configures the domains for channel decoding transmissions based on different modulation standards. Specifically, the configuration information provided by the global control processor at times configures the first domain processing apparatus and the second domain processing apparatus for channel decoding 8-VSB transmissions based on the ATSC standard. Also, the configuration information provided by the global control processor at other times configures the first domain processing apparatus and the second domain processing apparatus for channel decoding COFDM transmissions based on the DVB-T standard.

Figure 2:
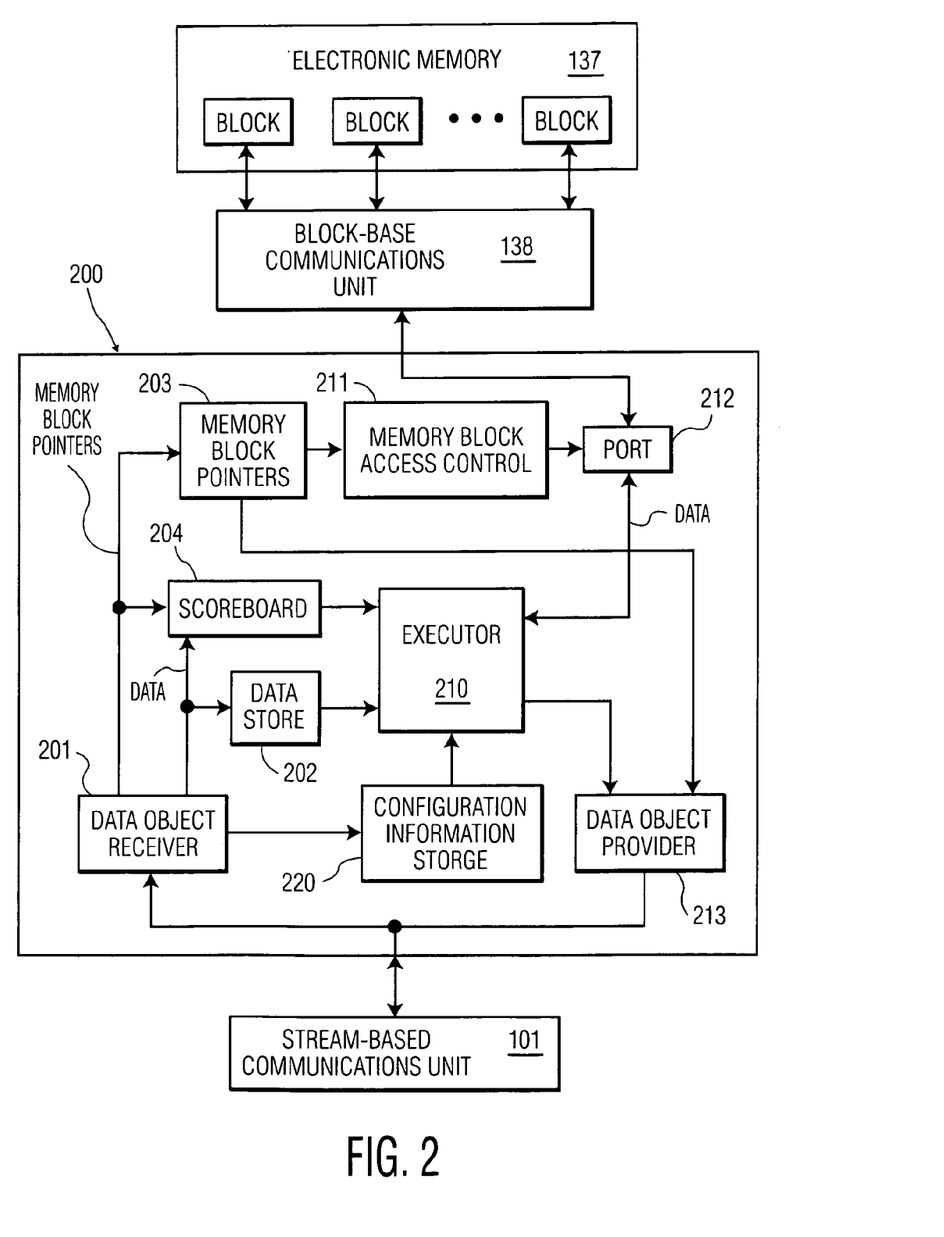
FIG. 2 shows a multi-processor unit of the invention with block-index values used for data flow control.

FIG. 2 illustrates selected portions of processor 200 relevant for processor control. Elements that are similar to those in FIG. 1 have been given the same reference numbers, and are not discussed in detail. Processor 200 receives data objects from a previous processor (not shown) into data object receiver 201. Data is stored at 202 and memory block pointers are stored at 203. Scoreboard 204 determines when the processor has the data and memory block pointers required for processing data. When the scoreboard signals executioner 210 then the processor processes the stored data and the data in the indicated memory block. Memory block access control 211 allows the executioner to access memory blocks through the port 212 to block-based communications unit 138 if a pointer to the memory block has been received. When processing the data is complete then any data that needs to be provided through the stream-based communications unit to the subsequent processor is sent to the data object provider 213 along with pointers to any memory blocks that the subsequent processor will need to further process the data. Each processor has exclusive use of memory blocks that it has pointers to until it terminates its access by passing the pointer to the memory block to a subsequent processor.

Before data begins to be processed, data object receiver 201 receives configuration control information that is stored in configuration information storage 220. The configuration information controls the executioner during data processing.

Figure 3:
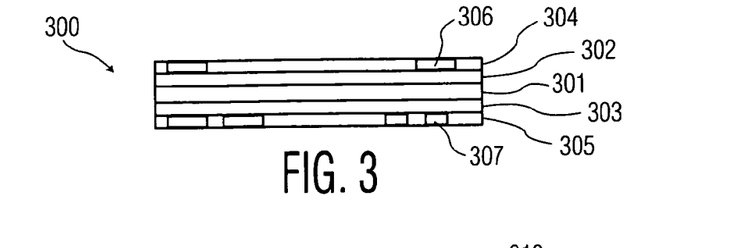
FIG. 3 illustrates an integrated circuit chip having the multi-processor unit of FIG. 1 or FIG. 2.

FIG. 3 shows an integrated circuit chip (300) containing the multi-processor unit (100) of FIG. 1. The chip includes a substrate (301) of semiconductor material with different portions having different levels of impurities. A layer of insulation (302, 303) is formed on the semiconductor substrate and a layer of wiring (304, 305) is formed over the insulation. The wiring layer includes connection pads (306, 307) for flip-chip or wire-bond connection to a circuit board. The different portions of semiconductor material and wiring layer provide the multi-processor unit (100) of FIG. 1.

Figure 4:
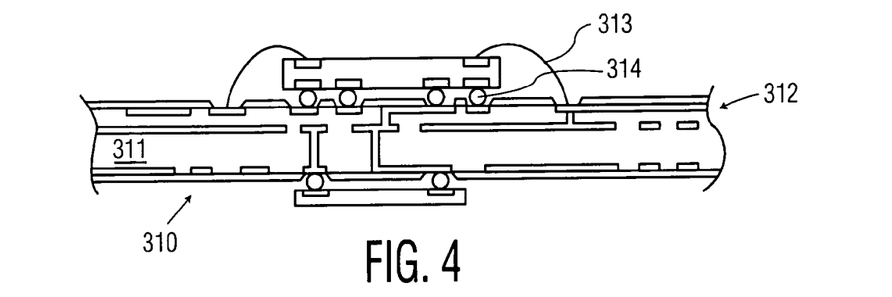
FIG. 4 illustrates a circuit board assembly with the integrated circuit chip of claim 3.

FIG. 4 illustrates a circuit board assembly (310) including the integrated circuit chip of FIG. 3. The assembly includes a circuit board substrate (311) and a wiring layer (312) on the circuit board substrate including connection pads for an integrated circuit chip. The integrated circuit chip (300) of FIG. 3 mounted on the circuit board substrate using for example epoxy. Then flip-chip or wire-bond connections (313, 314) are formed between the connection pads of the integrated circuit chip and the connection pads of the wiring layer.

Figure 5:
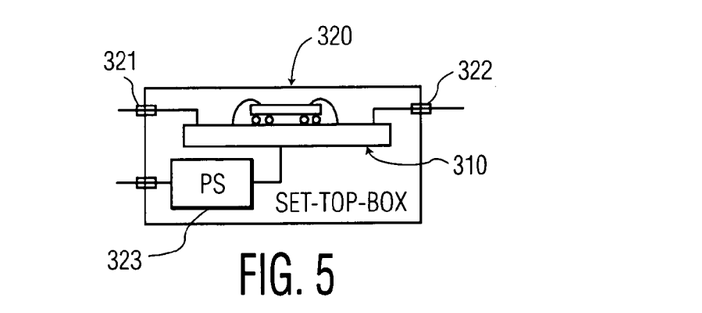
FIG. 5 illustrates a set-top-box containing the circuit board assembly of claim 4.

FIG. 5 shows a set-top-box (320) containing the circuit board assembly (310) of claim 4. The set-top-box includes a connection (321) for receiving a channel encoded multimedia signal and a connection (322) for transmitting a channel decoded multimedia signal. The circuit board assembly (310) of FIG. 4 decodes the encoded multimedia signal to provide the decoded multimedia signal. Also, a power supply (323) is connected to the circuit board assembly to provide power.

Figure 6:
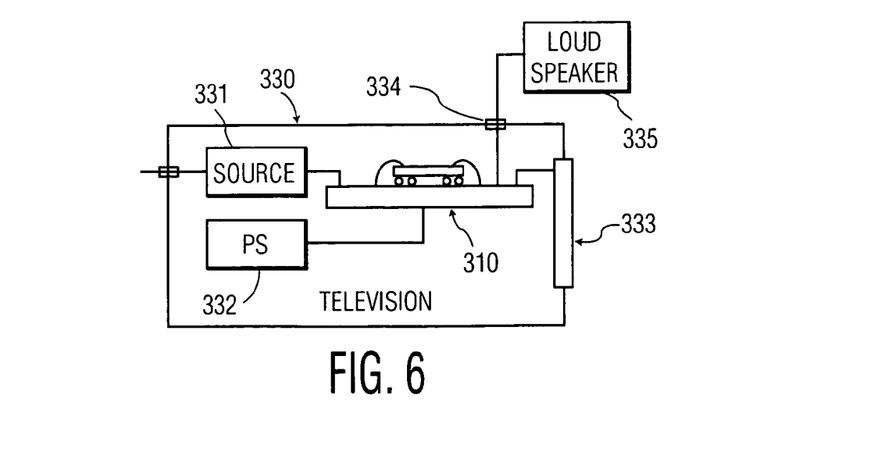
FIG. 6 illustrates a digital television set containing the circuit board assembly of claim 4.

FIG. 6 illustrates a digital television set (330) containing the circuit board assembly (310) of FIG. 4. The television includes a source (331) for providing a channel encoded multimedia signal from a transmission media. The source may be a cable television system, an antenna receiving terrestrial broadcasts, a satellite antenna, a DVD player, a digital tape drive, or any other source of multimedia signals. The television contains the circuit board assembly (310) of FIG. 4, for decoding the encoded multimedia signal to provide a decoded multimedia signal. The television also includes a power supply (332) connected to the circuit board assembly to provide power to the circuit board assembly. Finally in order to play the multimedia program, the television includes a display (333) connected to the circuit board assembly for presenting the video signals of the decoded multimedia signal and a loud speaker 335 and/or a connection (334) for load speaker (335) for presenting audio signals of the decoded multimedia signal.

I claim:

1. A multi-processor unit, including: communication means for receiving data into the unit and transmitting data from the unit;

first domain processing means for first processing the data depending on first domain configuration information, the first domain processing means including multiple first domain processors each connected to the communication means for receiving data and transmitting data to the communication means including data transmitted between processors, each first domain processor differently sub-processing the data in order to first process the data, the first domain processors including a first domain control processor for controlling the first processing of the first domain;

second domain processing means for second processing the first processed data depending on second domain configuration information, the second processing being different than the first processing, the second domain processing means including multiple second domain processor each connected to the communication means for receiving data and transmitting data to the communication means including data transmitted between processors, each second domain processor differently sub-processing the data in order to second process the data, the second domain processors including a second domain control processor for controlling the second processing of the second domain; and a global control processor connected to the communication means for providing the first domain configuration information and the second domain configuration information through the communication means for configuring the first and second domains.

2. The multi-proesessor unit of claim 1, in which:

the communication means include a stream-based communication means connected to the global control processor and connected to a plurality of the processors of the first and second domain including the first and first domain control processors for transmitting information streams between the connected processors;

the stream-based communications means are connected to an input/output bus to at times receive a stream of data into the multi-processor unit through the stream-based communications means into one of the connected processors and to at other times transmit a stream of data from one of the connected processors through the stream-based communications means onto the input/output bus;

the multi-processor unit includes blocks of electronic memory and the communication means includes block-based communication means connected to the memory blocks and connected to one or more of the first domain processors and one or more of the second domain processors for selectively interconnecting the connected processors to the memory blocks, with only one processor at a time being interconnected to one of the memory blocks, and processors of different domains being interconnected at different times to the same memory block;

the control of the domain control processors during operation includes data flow driven control so that receiving a data object through the stream-based communication means triggers processing by the domain control processor;

the data objects include data and indicators of memory blocks, when a domain receives an indicator of a memory block it has exclusive access to the memory block and when the domain passes the indicator of the memory block it yields all access to the memory block;

the indicators of memory blocks include addresses of the memory blocks;

each domain control processor, controls access between
the memory blocks that the domain has exclusive
access to and the processors of the domain;
each processor that is connected to the block-based communication means receives data from the memory blocks and stores data in the memory blocks through address and data registers of the processor and control signals from the domain control processor control operations of the registers of the processors of the domain that load and store information to the memory blocks exclusively accessed by the domain;
within the domains, control of the processors includes data flow driven control depending on data received by the processor from the stream-based communication means and from the memory blocks through the registers controlled by the domain control processor;
within the domains, control of the processors includes direct control by the domain control processor by control signals provided directly through control lines to the other domain processors from the domain control processor;
at least one of the domain control processors includes a periodic sequencer that initiates control commands transmitted to other processor to initiate subroutines in those processors depending on an index counter, the processing of the first domain including FFT and IFFT processing of blocks of data in the memory blocks;
the processing of the second domain including equalization of blocks of data in the memory blocks;
the multi-processor unit further comprises a third domain processing means including at least one processor connected to the stream-based communication means for forward error correction of a stream of data;
each processor is structurally different from the other processors of the multi-processor unit for performing a different portion of channel decoding of transmission signals;
the first and second domain configuration information configures the domains for channel decoding transmissions based on different modulation standards;
the configuration information provided by the global control processor at times configures the first domain processing means and the second domain processing means for channel decoding 8-VSB transmissions based on the ATSC standard;
the configuration information provided by the global control processor at other times configures the first domain processing means and the second domain processing means for channel decoding COFDM transmissions based on the DVB-T standard.

3. An integrated circuit chip containing the multi-processor unit of claim 1, including:
a substrate of semiconductor material with different portions having different levels of impurities; and
a layer of insulation on the semiconductor substrate;
a layer of wiring including connection pads for flip-chip or wire-bond connection to a circuit board; and wherein the different portions of semiconductor material and wiring layer provide the multi-processor unit of claim 1.

4. A circuit board assembly including the integrated circuit chip of claim 3, including:
a circuit board substrate; a wiring layer on the circuit board substrate including connection pads for an integrated circuit chip;
the integrated circuit chip of claim 3 mounted on the circuit board substrate; and
flip-chip or wire-bond connections between the connection pads of the integrated circuit chip and the connection pads of the wiring layer.

5. A set-top-box containing the circuit board assembly of claim 4, comprising: a connection for receiving a channel encoded multimedia signal; a connection for transmitting a channel decoded multimedia signal; the circuit board assembly of claim 4 for decoding the encoded multimedia signal to provide the decoded multimedia signal; and a power supply connected to the circuit bond assembly to provide power.

6. A digital television set containing the circuit board assembly of claim 4, including:
a source for providing a channel encoded multimedia signal from a transmission media; the circuit board assembly of claim 4, for decoding the encoded multimedia signal to provide a decoded multimedia signal;
a power supply connected to the circuit board assembly to provide power to the circuit board assembly;
a display connected to the circuit board assembly for presenting the video signals of the decoded multimedia signal; and
a connection for a load speaker for presenting audio signals of the decoded multimedia signal.

7. The multi-processor system of claim 1, wherein the multi-processor unit includes blocks of electronic memory and the communication means perform block-based communication with the memory blocks and connected to one or more of the first domain processors and one or more of the second domain processors for selectively interconnecting the connected processors to the memory blocks, with only one processor at a tune being interconnected to one of the memory blocks, and processors of different domains being interconnected at different times to the same memory block.

8. The multi-processor system of claim 1, wherein the control of the domain control processors during operation includes data flow driven control so that receiving a data object through the stream-based communication means triggers processing by the domain control processor.

9. The multi-processor system of claim 1, wherein control of the domains by the domain control processor is provided directly through control lines to the other domain processors from the domain control processor.

10. The multi-processor system of claim 1, wherein each processor is structurally different from the other processors of the multi-processor unit for performing a different portion of channel decoding of transmission signals.

11. The multi-processor system of claim 1, wherein the first and second domain configuration information configures the domains for channel decoding transmissions bend on different modulation standards.

12. The multi-processor system of claim 1, wherein the configuration information provided by the global control processor at times configures the first domain processing means and the second domain processing means for channel decoding 8-VSB based on the ATSC standard.

13. A multi-processor system for processing data, including:
a plurality of memory blocks in an electronic memory;
block-based communication means connected to the memory blocks to provide access to the memory blocks; stream-based communication means;
a plurality of processors connected to the block-based communication means for processing data in the memory blocks and connected to the stream-based communication means for providing data objects from a processor to a subsequent processor, the data objects including data for processing the data and pointers to memory blocks to control access to the memory blocks, the processors having means for data flow driven process control so that receiving data objects from a previous processor through the stream-based communication means triggers processing by the subsequent processor that receives those data objects, each processor having exclusive control for accessing data in one or more of the memory blocks, and each processor receiving the exclusive control of a memory block by receiving the pointer to the memory block from the previous processor through the stream-based communications means and each processor yielding exclusive control to the subsequent processor by providing a pointer to the memory block to the subsequent processor through the stream-based communication means.

14. The multi-processor system of claim 13, wherein the communication means perform block-based communication with the memory blocks and connect to one or more of the first domain processors and one or more of the second domain processors for selectively interconnecting the connected processors to the memory blocks, with only one processor at a time being interconnected to one of the memory blocks, and processors of different domains being interconnected at different times to the same memory block.

15. The multi-processor system of claim 13, wherein the control of the domain control processors during operation includes data flow driven control so that receiving a data object through the stream-based communication means trigger processing by the domain control processor.

16. The multi-processor unit of system 13, wherein control of the domains by the domain control processor is provided directly through control lines to the other domain processors from the domain control processor.

17. The multi-processor unit of system 13, wherein each processor is structurally different from the other processors of the multi-processor unit for performing a different portion of channel decoding of transmission signals.

18. The multi-processor unit of system 13, wherein the first and second domain configuration information configures the domains for channel decoding transmissions based on different modulation standards.

19. The multi-processor unit of system 13, wherein the configuration information provided by the global control processor at times configures the first domain processing means and the second domain processing means for channel decoding 8-VSB transmissions based on the ATSC standard.

20. The multi-processor system of claim 13, wherein the configuration information provided by the global control processor at other times configures the first domain processing means and the second domain processing means for channel decoding COFDM transmissions based on the DVB-T standard.

* * * * *